Sept. 15, 1936.  J. W. CHARRON  2,054,692
PULLEY CONSTRUCTION
Filed Nov. 4, 1935

INVENTOR.
Joseph W. Charron
BY Walter C. Ross
ATTORNEY.

Patented Sept. 15, 1936

2,054,692

UNITED STATES PATENT OFFICE 2,054,692

PULLEY CONSTRUCTION

Joseph William Charron, Springfield, Mass.

Application November 4, 1935, Serial No. 48,171

1 Claim. (Cl. 74—242.5)

This invention relates to improvements in pulley constructions and is directed more particularly to improvements in pulley mechanism for sewing machines and similar apparatus.

The principal objects of the invention are directed to the provision of a pulley construction adapted for use in connection with a sewing machine or the like wherein a pair of pulley wheels are constructed and arranged for relative rotation.

As a special feature of the invention, means is provided whereby one pulley wheel is mounted for free rotation relative to the other in such a way that friction is avoided and efficiency in operation is facilitated.

Another objection of the invention is the provision of a pulley construction which is economical to manufacture and which is arranged to operate with utmost quietness and smoothness.

Various other novel features and advantages of the invention will be hereinafter more fully referred to in connection with the accompanying description of the present preferred form of the invention, reference being had to the accompanying drawing wherein.

Figure 1:
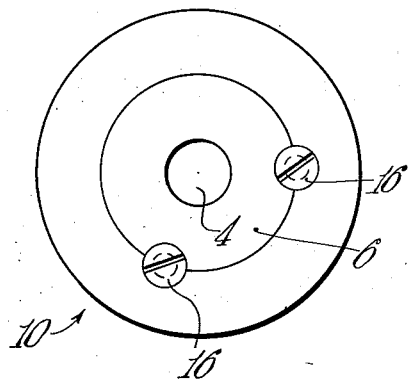
Fig. 1 is an end elevational view of a pulley structure embodying the novel features of the invention.
Figure 2:
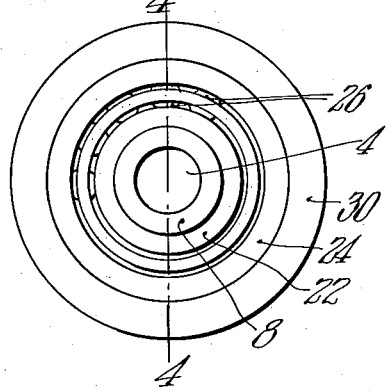
Fig. 2 is an end elevational view looking at the end of the device which is opposite from the end shown in Fig. 1.
Figure 3:
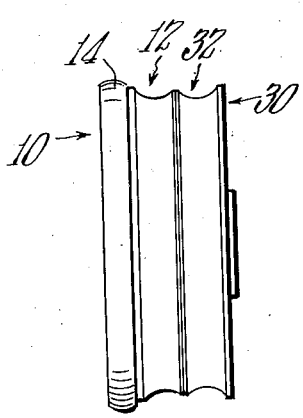
Fig. 3 is a side elevational view of the pulley construction shown in Figs. 1 and 2.

Referring now to the drawing more in detail, the invention will be fully described.

The pulley construction of the invention includes a central hub or arbor part 2 which is bored at 4 for receiving a shaft or the like to which it may be secured. Set screws or any other suitable means may be provided for securing the shaft and arbor.

Figure 4:
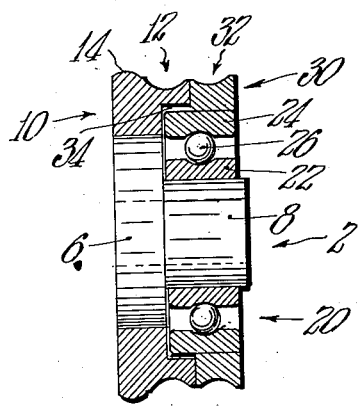
Fig. 4 is a sectional elevational view on the line 4—4 of Fig. 2.

The hub or arbor 2 includes a flanged part 6 and a relatively reduced part 8, as shown more clearly in Fig. 4. A pulley wheel 10 is provided and this has a belt groove 12 therearound and a relatively narrow peripheral part 14, which is preferably knurled.

The pulley wheel 10 is secured to the flanged part 6 of the central hub member 2. To facilitate the securing together of the parts 6 and 10 a flat-headed screw or screws 16 may extend through holes which are provided between abutting surfaces of the parts 6 and 10. In this way the screws 16 may be in engagement with the parts so as to hold them together for simultaneous rotation.

An anti-friction bearing such as a ball bearing 20 has an inner race 22 for surrounding the reduced part 8 of the center arbor 2 and an outer race 24 with a plurality of rotatable balls 26 therebetween. A second pulley wheel 30 has a belt groove 32 therearound and it is associated with the outer race 24 of the ball-bearing assembly.

The inner face of the pulley wheel 10 is preferably recessed as at 34 so as to be free of the ball bearing assembly, as shown in Fig. 4. Thus, it will be observed, the pulley wheel 30 is mounted for free rotative movements relative to the pulley wheel 10 so that the pulley runs smoothly and noiselessly, all to the end that the pulley structure may be used with such machines as a sewing machine or the like where high speed, quietness, accuracy and smothness are essential.

Preferably, the above-mentioned parts are assembled in such a way that the adjacent faces of the pulley wheels 10 and 30 are spaced a slight distance apart. This is so that any frictional action during the relative rotation of the wheels is avoided. Also by properly fitting the inner race 22 of the ball-bearing assembly on the part 8 of the central arbor member and the pulley wheel 30 on the outer race of the ball-bearing assembly, end play of the parts is eliminated. In this way the desired smoothness, quietness and efficiency in operation is insured.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

A unitary tight and loose pulley structure for a sewing machine or the like comprising in combination, a central arbor bored for securing a shaft and having an end flange and a reduced part adjacent thereto, a grooved tight pulley of greater width than said flange bored to receive the same provided with a recess on the inner side thereof which is greater in diameter than said flange and having a bottom substantially flush with the inner side of the flange, means securing the said pulley to the flange, a ball bearing having an inner race on the reduced part of the arbor and a relatively rotatable outer race of greater face than the depth of the recess in the tight pulley having a part extending from the inner side of the said pulley, and a grooved loose pulley closely adjacent the tight pulley bored to receive the extending part of the outer race, the said pulleys and the outer race and recess of the tight pulley being spaced for free rotation of the tight-pulley, arbor and inner race relative to the loose pulley and outer race.

JOSEPH WILLIAM CHARRON.